May 25, 1948.                S. NOODLEMAN                2,442,207
                       SINGLE PHASE MOTOR CONTROL SWITCH
                    Filed Oct. 24, 1945        2 Sheets—Sheet 1

May 25, 1948.        S. NOODLEMAN        2,442,207
SINGLE PHASE MOTOR CONTROL SWITCH
Filed Oct. 24, 1945        2 Sheets-Sheet 2
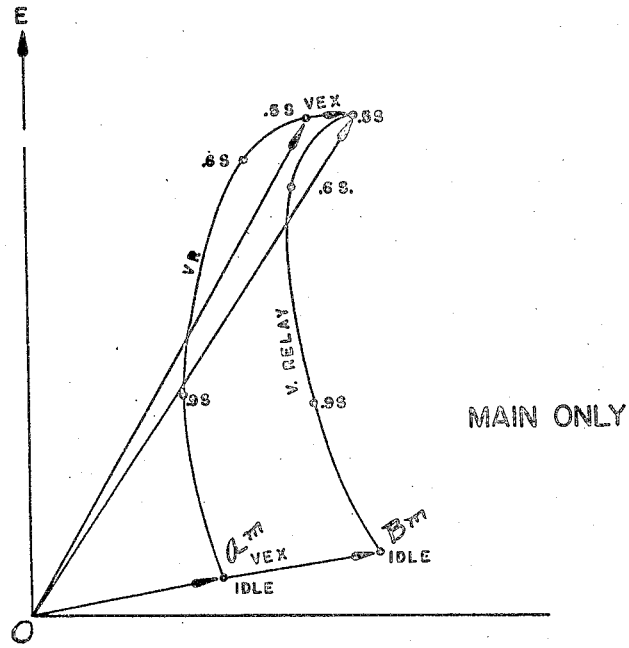
Fig 4.        S= SYNCHR'S SPEED
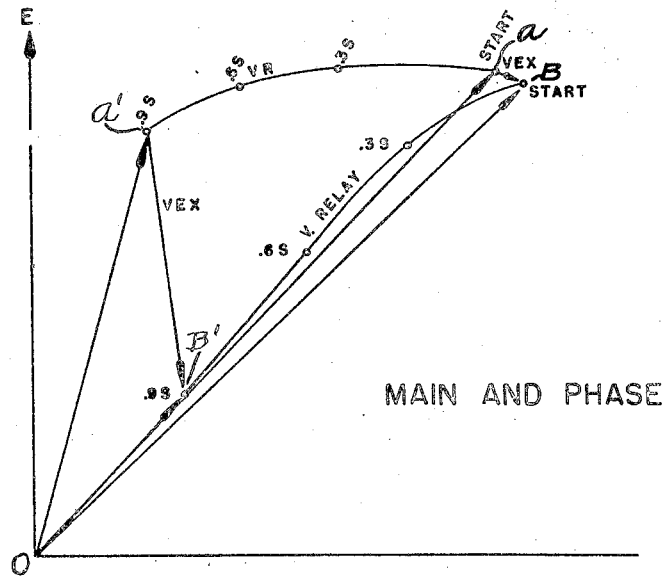
Fig 5.
INVENTOR
Samuel Noodleman
BY
Henry G. Ploeg
ATTORNEY Patented May 25, 1948

2,442,207

UNITED STATES PATENT OFFICE 2,442,207

SINGLE-PHASE MOTOR CONTROL SWITCH

Samuel Noodleman, Dayton, Ohio, assignor, by mesne assignments, to Worthington Pump and Machinery Corporation Application October 24, 1945, Serial No. 624,174

5 Claims. (Cl. 318—221)

1

This invention relates to a single phase motor control switch and more particularly to a single phase motor control switch wherein the resultant of the voltages having a phase displacement is used as a control voltage.

When single phase alternating current is used in energizing an electric motor that functions as an induction motor, it is necessary to provide some type of phase displacement to provide the initial starting torque. As a result thereof, split phase motors have been developed, wherein two or more windings have been used in developing torque, the windings being so interconnected into the circuit that there is a phase difference between the applied voltages or currents passing through the windings.

The split phase windings usually develop a large starting torque at the expense of efficiency. That being the case, it is desirable either to open the starter winding or to change the impedance of the starter winding when the motor attains a predetermined speed.

An object of this invention is to provide a switching mechanism for either opening the starter winding or for switching the starter winding into an impedance circuit suitable for running operation, which switching mechanism is responsive to voltage vectors, one of which is in phase with the input current of the motor and the other has a relative phase relation thereto, depending upon the flux density and the phase displacement of the magnetic flux in the motor.

Another object of this invention is to provide a switching mechanism that is operated in response to the resultant vector obtained by combining a voltage vector in phase and magnitude proportional to the total motor current with a voltage vector that is generated in a coil linking the magnetic flux generated by the main field winding.

Other objects and advantages reside in the construction of parts, the combination thereof and the mode of operation, as will become more apparent from the following description.

Figure 3:
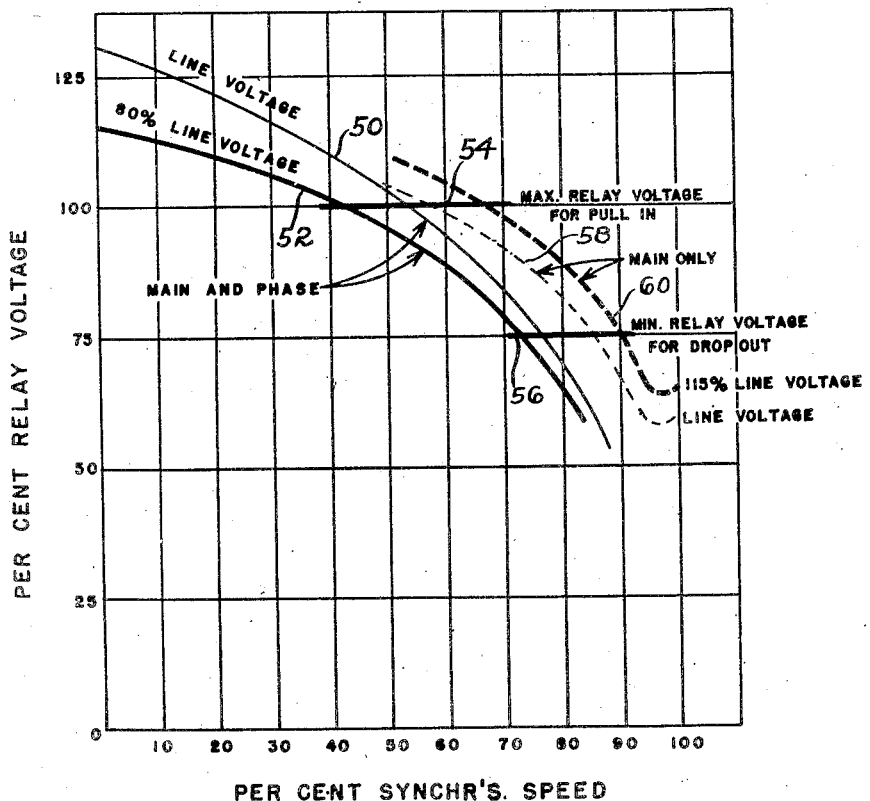

Figure 3 discloses curves obtained by plotting relay voltage against the speed of the motor.

Figure 4 discloses a series of vector diagrams

2 obtained when the motor operates on the main winding only.

Figure 5 is another vector diagram disclosing a series of vectors obtained when both the main and the phase windings are energized.

Figure 1:
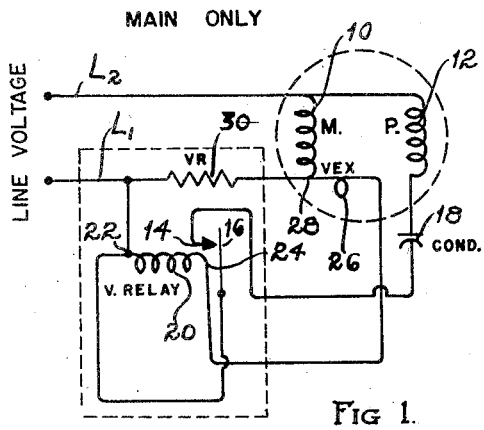
Figure 1 is a schematic wiring diagram disclosing a capacitor phase field winding for an induction motor associated with a relay switching mechanism that has opened the starter winding.
Figure 2:
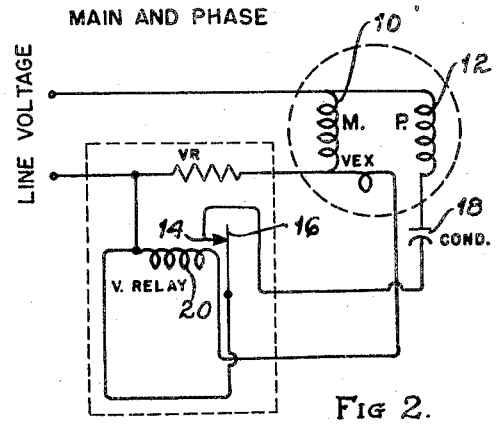
Figure 2 is a schematic circuit diagram similar to Figure 1, wherein both field windings are energized.

Referring to the drawings, Figures 1 and 2 disclose a split phase motor provided with a main field winding 10 and a starter winding or split phase winding 12. For the purpose of illustration, the winding 12 has been shown as a starter winding that is opened when the rotor attains a predetermined speed. A switch including a stationary contact 14 and a movable contact 16 is used in supplying voltage to the starter winding and for opening the starter winding when the rotor attains the desired speed. For the purpose of illustration, a condenser 18 has been connected in series with the starter winding for providing a phase displacement or a leading current through the starter winding. Instead of a condenser, a resistance or other suitable impedance for producing the desired phase displacement may be used. The condenser has been shown merely for the purpose of illustration.

The movable switch contact member 16 is actuated by an electromagnetic relay or coil 20. This coil 20 has one terminal 22 connected into the input line L₁. The other terminal 24 of the winding 20 is connected through a coil 26 to one terminal 28 of the main winding 10. Line L₁ is connected through a suitable resistance 30 to the terminal 28. The coil 26 is laid in the stator and links the flux generated by the main and phase windings, so that the voltage generated in the coil 26 is proportional to the rotor speed, as well as the main and phase currents. The voltage supplied to the relay coil 20 is the resultant voltage vector obtained by adding the voltage drop across the resistance 30 and the voltage generated in the coil 26, added vectorially.

As may best be seen by referring to Figure 5, the vector OA represents the voltage drop across the resistance 30. At this instance, a high current passes through the motor. AB is the voltage generated in the coil 26 and OB is the resultant voltage obtained by adding the voltage across the resistance 30 to the voltage generated in the coil 26. This results in a high voltage being applied to the relay so as to close the starter winding circuit. In both Figures 4 and 5 the curve labelled VR represents the loci of the voltage vectors across the resistance 30. The designations .9S, .6S, .5S represent 90%, 60% and 50% respectively of the rotor synchronous speed. In Figure 5 OA' represents the voltage across the resistance 30 when the rotor operates at 90% synchronous speed. The voltage vector across the winding 26 is then A'B' and the voltage supplied to the relay winding 20 is represented by the vector OB'—only a fraction of the original voltage OB. The relay may be adjusted to open the starter winding at any desired speed for normal line voltage, as will appear more fully later.

In Figure 4 the curves of the various vectors have been shown when only the main winding 10 is energized. In this figure OAm is the voltage drop across the resistance 30 when the motor idles. The voltage vector AmBm is the voltage across the coil 26. The voltage vector OBm is the voltage vector across the terminals of the relay. The curve VR represents the loci of the vector terminals of the various voltages across the resistance 30 from idle speed to 50% of synchronous speed. The V relay curve represents the loci of the voltage across the relay throughout the various designated speeds.

Referring to the graph shown in Figure 3, the relay voltages resulting from various line voltages have been shown. The curve 50 is the voltage applied to the relay when normal line voltage is supplied to both the main winding 10 and the starter winding 12. The maximum voltage required for the relay to pull in or close the relay switch is represented by the horizontal line 54. The 80% line voltage is represented by the curve 52, showing the voltage applied to the terminals of the relay. Even though the line voltage applied to the motor may drop below 80% of normal line voltage, it can readily be seen that the voltage applied to the relay for starting purposes is greater than the pull in voltage 54.

It is not only essential that the relay pulls in, or closes the switch, it is also essential that the relay drops out or opens the starter winding at the proper time. The critical conditions for opening the starter winding occur when the voltage is higher than normal operating voltage, when it is important that the relay will open circuit the starter winding before the motor reaches the synchronous speed.

The straight line curve 56 represents the minimum relay voltage for opening the starter winding. The dot-dash curve 58 represents the voltage applied to the relay as a result of normal line voltage when only the main winding is in the circuit. The heavy dotted curve 60 represents the relay voltage when the applied voltage on the main winding is 115% of normal operating voltage. Even though the main line voltage may exceed the normal line voltage by 15%, the relay drops out at 90% of synchronous speed.

The resistance 30 may consist of a piece of high resistance wire connected in series with one of the leads. For some purposes instead of the resistance 30, a suitable high resistance coil may be used, such as the heater coil of a thermostat. It is also possible to incorporate the resistance as a part of the relay. However, by incorporating the resistance into the relay, it will then be necessary to provide different size relays for different size motors. The same relay may be used for a great number of different size motors by merely selecting the proper resistance 30, connected in series with one of the main lines and used in association with a suitable pick-up coil.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An electromagnetic switching device for use in the starter winding circuit of a single phase motor having a main field winding and a starter winding, the combination including a resistance element connected in series to one of the input lines of the motor, a pick-up coil having one terminal connected between the resistance and the main field winding of the motor, said pick-up coil being located in inductive relation with the motor windings and an electromagnetic switch including an energizing coil having one terminal connected in series with the pick-up coil and the other terminal connected to the input line having the resistance so that the pick-up coil and the coil of the electromagnetic switch are connected in series with each other and in parallel to the resistance whereby the voltage supplied to the terminals of the coil of the electromagnetic switch is the resultant of the voltage drop across the resistance and the voltage generated in the pick-up coil.

2. An electromagnetic switching device for use in the starter winding circuit of a single phase motor, the combination including a main field winding, a starter winding, means for causing a voltage drop in phase with the current flowing through the main field winding, a pick-up coil located to link a portion of the stator flux for generating a voltage proportional to the rotor speed as well as the main and phase currents, and an electromagnetic switch having an energizing coil energized by a voltage that is the resultant of the voltage drop across said first means and the voltage generated in said pick-up coil, said electromagnetic switch being actuated when predetermined conditions exist in the motor.

3. An electromagnetic switching device for use in the starter winding circuit of a single phase motor, the combination including a main field winding, a starter winding, means for causing a voltage drop in phase with the current flowing through one of the motor windings, a pick-up coil located to link a portion of the stator flux for generating a voltage that has a phase displacement influenced by the phase displacement of the current flowing through the motor windings, and an electromagnetic switch having a solenoid energized by a voltage that is the resultant of the voltage drop across said means and the voltage generated in said pick-up coil, said electromagnetic switch being actuated when predetermined conditions exist in the motor.

4. An electromagnetic switching device for use in the starter winding circuit of a single phase motor, the combination including a main field winding, a starter winding, an electromagnetic switch having an energizing coil, means for producing a first voltage in phase with the input current, and means responsive to the motor speed and the phase displacement of the currents flowing in the motor windings for producing a second voltage and means for energizing said energizing coil with the resultant of said voltages.

5. A voltage controlled switching device for use in the starter winding circuit of a single phase motor, the combination including a main field winding, a starter winding, means for causing a voltage drop in phase with the current flowing through at least one of the motor windings, a pick-up coil located to link a portion of the stator flux for generating a voltage that is influenced by the phase displacement of the currents flowing through the windings of the motor and the speed of the rotor, and switching means energized by a voltage that is the resultant of the voltage drop in phase with the current flowing through at least one of the motor windings and the voltage generated by the pick-up coil, said switching means being actuated when predetermined conditions exist in the motor.

SAMUEL NOODLEMAN.

REFERENCES CITED

The following references are of record in the file of this patent:

UNITED STATES PATENTS

| Number | Name | Date |
| --- | --- | --- |
| 1,315,965 | Jennings | Sept. 16, 1919 |
| 1,491,396 | Hall | Apr. 22, 1924 |
| 2,132,888 | Werner | Oct. 11, 1938 |